UNITED STATES PATENT OFFICE.

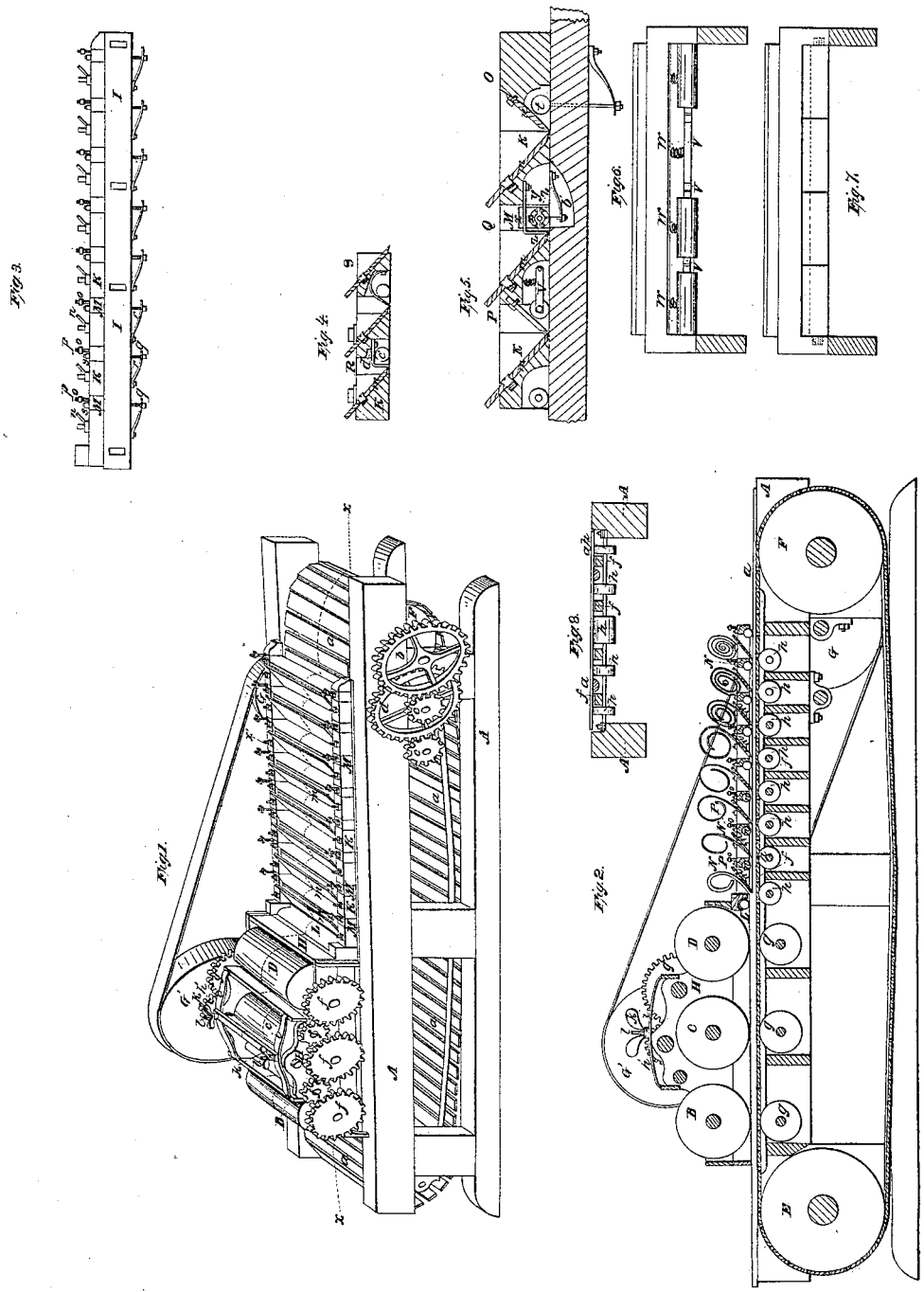

ENOS G. ALLEN, OF BOSTON, MASSACHUSETTS.

PLANING-MACHINE.

Specification of Letters Patent No. 6,809, dated October 23, 1849.

*To all whom it may concern:*

Be it known that I, ENOS G. ALLEN, of Boston, in the county of Suffolk and State of Massachusetts, have invented certain new and useful Improvements in Planing-Machines; and I do hereby declare that the following is a full, clear, and exact description of the characteristics which distinguish my invention from all others heretofore known, reference being had to the accompanying drawing, which forms part of this specification, and in which—

Figure 1 represents a perspective view of the machine complete; Fig. 2, a longitudinal section at the line X X of Fig. 1; Fig. 3, a side view of the plane stock frame; Figs. 4, 5, 6 and 7, various views of mouth pieces herein described; and Fig. 8, a transverse section of the endless band at the line X', X', of Fig. 1, showing the means by which it is supported.

The same letters indicate the same parts in all the figures.

My invention consists first in a peculiar arrangement of the feeding apparatus, and second in peculiar arrangements of the mouth pieces of the plane irons for the purposes herein described.

In the drawings A A is a strong frame or bench, to which the other parts of the machine are attached.

The feeding apparatus is composed of the endless band or chain $a$ $a$ on which the board is supported, and of the feed rollers B, C, D which act upon its upper surface. The endless band encircles the large wheels or pulleys E, F at the extremities of the frame A, motion is given to the rollers F and by them to the endless band by the train of wheels $b$ $c$ $d$ $e$, the last of which has the pulley G mounted on its shaft, to which a belt is applied. The endless band is supported by the longitudinal bearers $f$ $f$ and by the friction rollers $g$ $g$, $h$ $h$ the last of which ($h$ $h$) have their axes in the vertical plane passing through the cutting edges of the plane irons, so as to afford a firm unyielding support to the lumber at the point where the cutting is performed. The upper feed rollers B, C D have their journals in the frame H; this frame rises and falls according to the thickness and inequalities of the lumber to be planed, upon whose surface it is pressed by the adjustable springs $i$ $i$; the tension of these springs can be increased or diminished at pleasure by means of the set nuts $k$ $k$, acting upon the bolts $l$ $l$ which secure the frame H to the frame A. The feed rollers B, C, D have their shafts connected by the train of cog wheels $f'$ and are all put in motion by the wheels $g'$ $h'$ the last of which has a driving pulley G' mounted on its shaft.

The cutting is performed by the plane-irons $m$ $m$ $m$ each fixed to a separate stock K; all the stocks are bolted to the frame I which is raised or lowered according to the thickness required in the finished lumber. The plane-irons are so set that those nearest the feed rollers shall act like the "Jack-plane" taking off rank shavings to reduce the thickness of the lumber, while those toward the plane frame I by taking off thin shavings give the required smoothness.

To hold the lumber firmly during the cutting I employ various modifications of mouthpieces, which act conjointly with the rollers $h$ $h$. Before the first plane iron is the roller mouth piece L attached to frame H so as to rise and fall with it thereby adapting itself to the varying thickness or irregularities of the rough lumber. Immediately preceding each of the remaining plane irons is the self adjusting mouth-piece M. The first modification consists of a stock N (Figs. 2 and 3) of wood faced with metal or wholly of metal to which is attached a roller $n$ whose length is equal to that of the plane irons; the stock is free to rise and fall in a vertical direction within certain limits, according to the inequalities of the lumber, the limit of descent is the cutting edge of the plane-irons, the limit of ascent is regulated by the position of the stop nuts $o$ $o$ of the belts $p$ $p$ (Figs. 2 and 3) on which the stock slides, and which have their lower ends fixed in the plane iron frame. Each extremity of the stock is perforated to receive the rods $q$ $q$, to whose lower extremities are attached the springs $r$ $r$, and whose upper extremities are furnished with the nuts $s$ $s$, by which the requisite tension is given to the springs.

The second variety of mouth piece is represented in section at O Fig. 5; this is composed of a self adjusting roller $t$ combined with a nonelastic mouth iron $u$; the roller is pressed down upon the lumber by springs similar to those used with the preceding mouth-piece, the mouth iron $u$ is fixed to the stock of the plane iron immediately preceding the one to which it applies, and the direction of the mouth-iron is at right angles to the plane iron.

The third variety of mouth piece is represented in section at P Fig. 5, and a view of its face with the mouth-iron removed is represented in Fig. 6. In this variety the mouth iron is non-elastic, and coincides in width with the plane iron; the roller is divided into sections each attached to its own hinged frame $v$ and each independent of the rest; the pressure is given by the springs $w$ attached to the plane stock.

The fourth variety represented in section at Q Fig. 5 is composed of a self adjusting roller $x$, combined with an elastic mouth iron $y$, the journals of the roller are received in the pillow blocks $z$ which move vertically in the slots $a'$ of the mouth piece stocks, and to which the pressure springs $b'$ are attached. The fifth variety represented in section at R Fig. 4 is composed of a fixed roller $c'$, combined with an elastic mouth piece $d'$ both equal in width to the plane iron. The sixth variety represented in section at S, Fig. 4 is composed of a fixed roller combined with a sectional elastic mouth iron, of which a face view is given in Fig. 7. The general manipulation of my machine being similar to others of the same class, I do not deem it necessary particularly to describe the same.

The advantages resulting from my improvements are obvious when the various operations to which lumber is subjected are considered. First; lumber as it comes from the saw mill varies considerably in thickness, this arises from the carelessness of sawyers and imperfections in their machinery and from unequal shrinkage in seasoning; if the feed apparatus had but a single roller acting upon the upper surface of the lumber, and rough boards should successively be presented to the machine which differed in their respective thicknesses, the thicker one being first introduced, it is obvious that the roller would not grip the thin board at the moment of its presentation, and a momentary check would be given to the board in the machine, the result of which would be a splintering of the wood by the first plane iron, and a mark across its surface by the last. This is avoided by the use of two or more upper rollers, the frame H rocking upon the bolts $l$, $l$, and adapting itself to the varying thickness of the lumber; at the same time by increasing the surfaces in contact with the boards, the tension required in the spring, and the power necessary to propel the boards against the plane irons are diminished. Second. It is absolutely necessary in order to produce a truly finished surface on lumber, that it be firmly supported at the moment of cutting, this is effected by the application of the friction rollers $h$ $h$ whose axes are parallel to the edges of the plane irons, and lie in the vertical planes passing through them. The surfaces of the rollers are therefore always tangent to the endless band $a$ $a$ at lines immediately below the edges of the plane irons, these being the best possible points of support, while at the same time the endless band is supported longitudinally by the bearers $f$, $f$. Third. It frequently happens that the opposite edges of the same board are of unequal thickness, to such cases the self adjusting mouth-pieces apply themselves; the use of the roller preceding the mouth iron is to prevent the latter from sustaining the whole strain, which would cause it to indent itself in the surface of soft boards; the use of sectional divisions either in the rollers or mouth irons is to enable the plane irons to give a more perfect finish to the lumber, and prevent the uneveness arising from an accident to the plane irons by which their edge is indented or cracked; such indentation would produce a corresponding projection on the surface of the board, if this passed under a succeeding undivided roller or mouth iron, one of two things will take place, either the pressure will be sufficient to press the projection into the surface of the board, or the whole self adjusting mouth piece will rise to allow the projection to pass by, in the former case the exposure of the finished board to slight dampness will cause it to assume its original structure and the impressed portion will swell and appear above the surface of the wood, an example of which is afforded in that well known method of producing raised figures on wood by indenting the portions intended to be raised planing off the remaining portions, and then exposing the whole to damp whereby the indented portions assume their original structure, and rise above the planed surface; if the roller or mouth iron rise throughout the whole width of the board, then the latter is not held firm for the action of the plane iron, and a wavy surface will be produced; whereas if the roller or mouth iron be made sectional, only that section rises which is immediately in contact with the projection on the board while the remaining section press it firmly on the feed band ($a$ $a$).

What I claim as my invention and desire to secure by Letters Patent is,

The combination of adjustable stationary planes with an endless band suported transversely by friction rollers ($h$ $h$) whose axes are immediately below the cutting edges of the plane irons, and longitudinally by strips ($f$ $f$) substantially in the manner and for the purpose herein set forth.

In testimony whereof I have hereunto signed my name this fourth day of April, 1849.

ENOS G. ALLEN.

Witnesses:
P. H. WATSON,
E. S. RENWICK.